US007187421B2

(12) United States Patent
Tsunashima et al.

(10) Patent No.: US 7,187,421 B2
(45) Date of Patent: Mar. 6, 2007

(54) LIQUID CRYSTAL DISPLAY HAVING A SOURCE DRIVER AND SCANNING LINE DRIVE CIRCUIT THAT IS SHUTDOWN

(75) Inventors: Takanori Tsunashima, Fukaya (JP); Hiroyuki Kimura, Fukaya (JP); Masao Karube, Fukaya (JP); Hisao Fujiwara, Ageo (JP)

(73) Assignee: Toshiba Matsushita Display Technology Co., Ltd., Tokyo-To (JP)

(*) Notice: Subject to any disclaimer, the term of this patent is extended or adjusted under 35 U.S.C. 154(b) by 4 days.

(21) Appl. No.: 10/886,628

(22) Filed: Jul. 9, 2004

(65) Prior Publication Data

US 2005/0036078 A1 Feb. 17, 2005

(30) Foreign Application Priority Data

Jul. 11, 2003 (JP) ............................ 2003-195992

(51) Int. Cl.
*G02F 1/136* (2006.01)

(52) U.S. Cl. ........................ 349/41; 345/690; 345/208; 345/211; 345/90; 345/92; 349/38

(58) Field of Classification Search ............ 349/38–40; 345/208
See application file for complete search history.

(56) References Cited

U.S. PATENT DOCUMENTS 5,132,819 A * 7/1992 Noriyama et al. ............ 349/55
5,808,706 A * 9/1998 Bae ............................ 349/38
2002/0158993 A1* 10/2002 Murai ........................ 349/38

FOREIGN PATENT DOCUMENTS

JP 2001-255851 9/2001

* cited by examiner

*Primary Examiner*—Andrew Schechter
*Assistant Examiner*—Lucy Chien
(74) *Attorney, Agent, or Firm*—Oblon, Spivak, McClelland, Maier & Neustadt, P.C.

(57) ABSTRACT

A liquid crystal display according to one embodiment of the present invention, comprising: signal lines and scanning lines arranged in first and second directions on an insulation substrate; display elements formed in vicinity of cross points of the signal lines and scanning lines; liquid crystal capacitors and auxiliary capacitors which accumulate electric charge in accordance with voltages of the signal lines via said display elements; a signal line drive circuit which drives the signal lines; a scanning line drive circuit which drives the scanning lines; auxiliary capacitor power supply lines arranged in the first direction, to which one ends of said auxiliary capacitors arranged in the second direction are commonly connected; and auxiliary capacitor power supply line voltage control circuits which control voltages of said auxiliary capacitor power supply lines in sync with a cycle which drives said liquid crystal capacitors and said auxiliary capacitors by polarity reverse, wherein said auxiliary capacitor power supply line voltage control circuit supplies a first reference voltage to all of said auxiliary capacitor power supply lines during a predetermine period after power-on.

5 Claims, 9 Drawing Sheets

G1, G2, . . . Gn : SCANNING LINE
CS1, CS2, . . . CSn : AUXILIARY CAPACITOR POWER SUPPLY LINE

LIQUID CRYSTAL DISPLAY HAVING A SOURCE DRIVER AND SCANNING LINE DRIVE CIRCUIT THAT IS SHUTDOWN

CROSS REFERENCE TO RELATED APPLICATIONS

This application claims benefit of priority under 35 USC §119 to Japanese Patent Application No. 2003-195992, filed on Jul. 11, 2003, the entire contents of which are incorporated by reference herein.

BACKGROUND OF THE INVENTION

1. Field of the Invention

The present invention relates to a liquid crystal display having display elements formed in vicinity of cross points of signal lines and scanning lines on an insulation substrate.

2. Related Art

When a voltage is always applied to in the same direction with respect to liquid crystal, baking of liquid crystal occurs. Ordinarily, polarity reversal drive is performed in a liquid crystal display. In the polarity reversal drive, polarity of the applied voltage is switched at a constant period. There are a dot reversal drive for switching polarity for each pixel, a line reversal drive for switching polarity for each line, a frame reversal drive for switching polarity for each frame and the like.

In the case of performing the polarity reversal drive, voltage polarities of a signal line voltage and an auxiliary capacitor power supply line connected to an auxiliary capacitor have to be periodically changed. Because of this, there is a case of providing a plurality of reference power supplies for setting a voltage of the auxiliary capacitor power supply line (see Japanese Patent Publication Laid-Open No. 255851/2001).

However, when the power supply is on, the reference voltage that the auxiliary capacitor power supply line is connected becomes unstable. As a result, the voltage applied to the liquid crystal layer changes for each auxiliary capacitor power supply line, and there is a problem in which an undesirable bright line in a horizontal direction emerges.

SUMMARY OF THE INVENTION

In order to solve the above-described problem, an object of the present invention is to provide a liquid crystal display in which an undesirable bright line in a horizontal direction does not emerge.

A liquid crystal display according to one embodiment of the present invention, comprising:

signal lines and scanning lines arranged in first and second directions on an insulation substrate;

display elements formed in vicinity of cross points of the signal lines and scanning lines;

liquid crystal capacitors and auxiliary capacitors which accumulate electric charge in accordance with voltages of the signal lines via said display elements;

a signal line drive circuit which drives the signal lines;

a scanning line drive circuit which drives the scanning lines;

auxiliary capacitor power supply lines arranged in the first direction, to which one ends of said auxiliary capacitors arranged in the second direction are commonly connected; and auxiliary capacitor power supply line voltage control circuits which control voltages of said auxiliary capacitor power supply lines in sync with a cycle which drives said liquid crystal capacitors and said auxiliary capacitors by polarity reverse, wherein said auxiliary capacitor power supply line voltage control circuit supplies a first reference voltage to all of said auxiliary capacitor power supply lines during a predetermine period after power-on.

Furthermore, a liquid crystal display according to one embodiment of the present invention, comprising;

signal lines and scanning lines arranged in first and second directions on an insulation substrate;

pixel switching elements formed in vicinity of cross points of the signal lines and the scanning lines;

a signal line drive circuit which drives the signal lines; and a scanning line drive circuit which drives the scanning lines, wherein said scanning line drive circuit drives the scanning lines to turn on all of said pixel switching elements before a predetermined period to shut down power supply; and said signal line drive circuit applies a predetermined voltage to all the signal lines before a predetermined period to shut down the power supply.

Furthermore, a liquid crystal display according to one embodiment of the present invention, comprising:

signal lines and scanning lines arranged in first and second directions on an insulation substrate;

pixel switching elements formed in vicinity of cross points of the signal lines and the scanning lines;

a signal line drive circuit which drives the signal lines;

a scanning line drive circuit which drives the scanning lines;

liquid crystal capacitors and auxiliary capacitors which are provided corresponding to said pixel switching elements, respectively, and accumulate electric charge in accordance with voltages of the signal lines; and pixel electrodes to which one ends of said pixel switching elements, said liquid crystal capacitors and said auxiliary capacitors are connected, wherein said signal line drive circuit applies the same voltage as that of said opposite electrode to all the signal lines when a control signal supplied from outside of said insulation substrate is in a first logic; and said scanning line drive circuit turns on all the pixel switching elements when said control signal is in the first logic.

DETAILED DESCRIPTION OF THE INVENTION

Hereafter, a liquid crystal display according one embodiment of the present invention will be described more specifically with reference to the drawings.

(First Embodiment)

Figure 1:
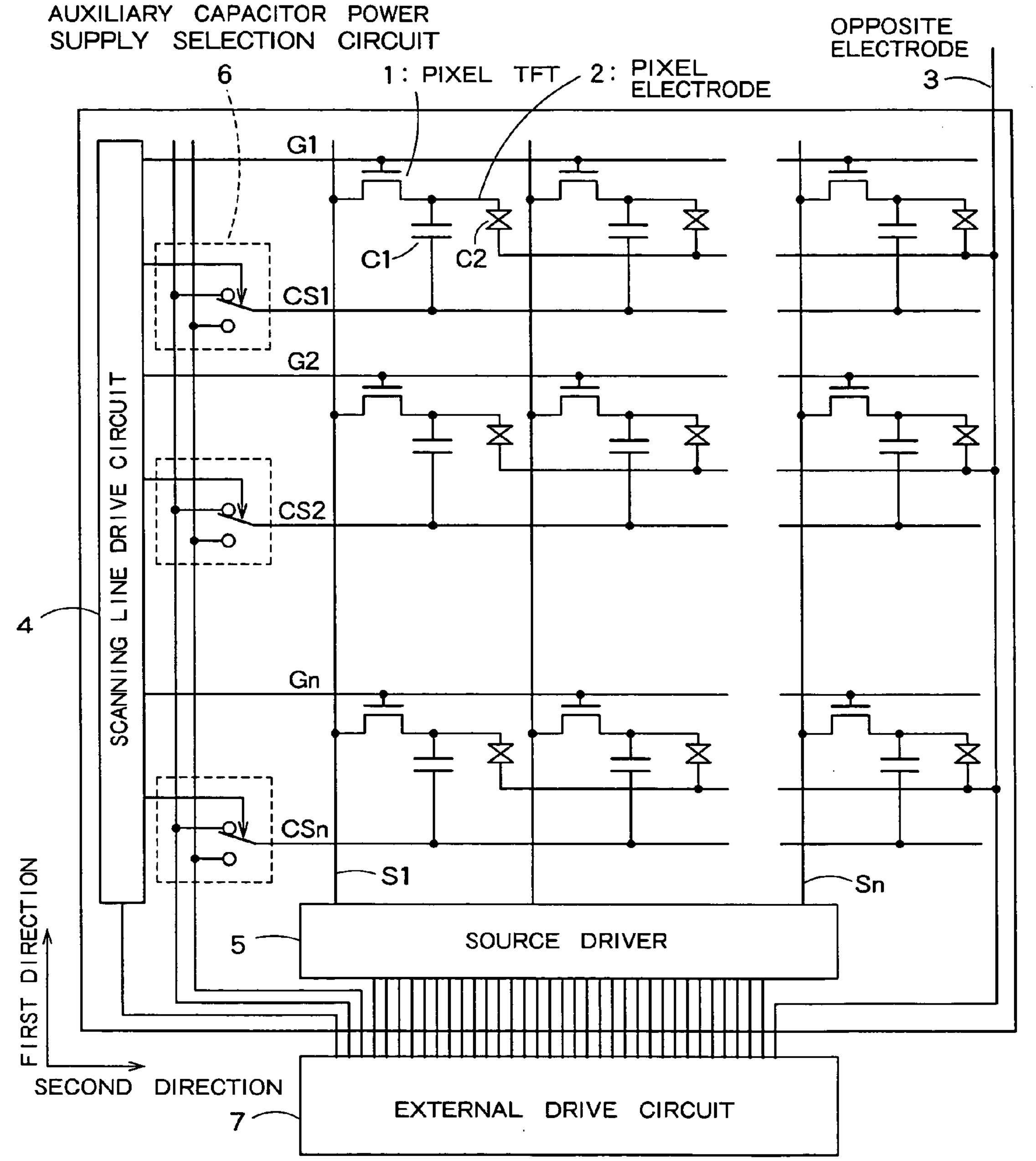
FIG. 1 is a block diagram showing schematic configurations of a liquid crystal display according to one embodiment of the present invention.

FIG. 1 is a block diagram showing schematic configurations of a liquid crystal display according to a first embodiment of the present invention. The liquid crystal display of FIG. 1 has signal lines S1-Sn and scanning lines G1-Gn arranged in first and second directions on a glass substrate, pixel TFTs (Thin Film Transistors) formed in vicinity of cross points of signal lines and scanning lines, auxiliary capacitors C1 and pixel electrodes 2 connected to drain terminals of the pixel TFTs 1, liquid crystal capacitors C2 formed between the pixel electrodes 2 and an opposite electrode 3 arranged opposite to the pixel electrodes 2 by sandwiching a liquid crystal layer, a source drive 5 for driving the signal lines, auxiliary capacitor power supply lines CS1-CSn connected commonly to one ends of the auxiliary capacitors C1 arranged in scanning line direction (the second direction), and auxiliary capacitor power supply selecting circuits 6 which set voltages on the auxiliary capacitor power supply lines CS1-CSn. The source driver 5 is provided outside of the glass substrate, or sends/receives pixel data and control signals for an external drive circuit 7 implemented on the glass substrate. A signal line drive circuit is composed of the source driver 5 and the external drive circuit 7.

The auxiliary capacitor power supply lines CS1-CSn are provided for the number of pixels in the first direction. The auxiliary capacitor power supply selection circuits 6 are provided corresponding to the auxiliary capacitor power supply lines CS1-CSn.

Figure 2:
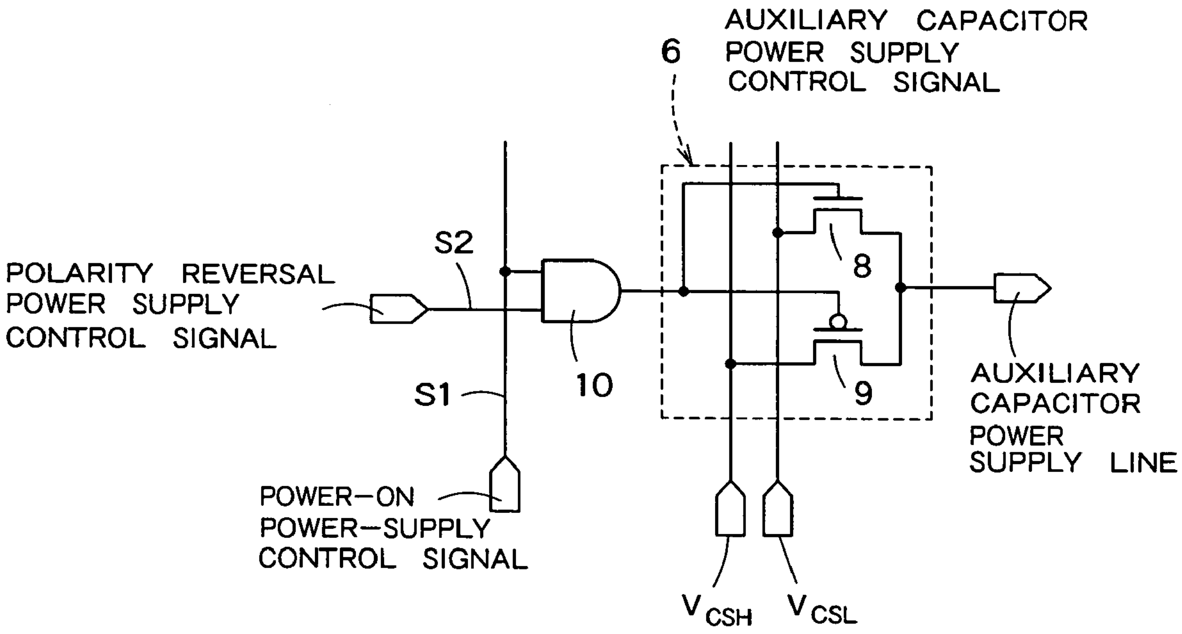
FIG. 2 is a circuit diagram showing detailed configurations of an auxiliary capacitor power supply selection circuit.

FIG. 2 is a circuit diagram showing detailed configurations of the auxiliary capacitor power supply selection circuits 6. As shown in FIG. 2, each of the auxiliary capacitor power supply selection circuits 6 has an NMOS transistor 8 for selecting whether or not to supply a first reference voltage VcsH to the auxiliary capacitor power supply lines CS1-CSn, and a PMOS transistor 9 for selecting whether or not to supply a second reference voltage VcsL (<VcsH) to the auxiliary capacitor power supply lines CS1-CSn. On/Off of the transistors 8 and 9 is controlled by the AND gate 10 in the scanning line drive circuit 4.

The AND gate 10 operates a logical product between a power-on power supply control signal s1 for controlling voltages on the auxiliary capacitor power supply lines CS1-CSn at power on time and a polarity reversal power supply control signal s2 for controlling the voltages on the auxiliary capacitor power supply lines CS1-CSn at polarity reverse time, and switches on/off of the transistors 8 and 9 based on the calculation result.

Figure 3:
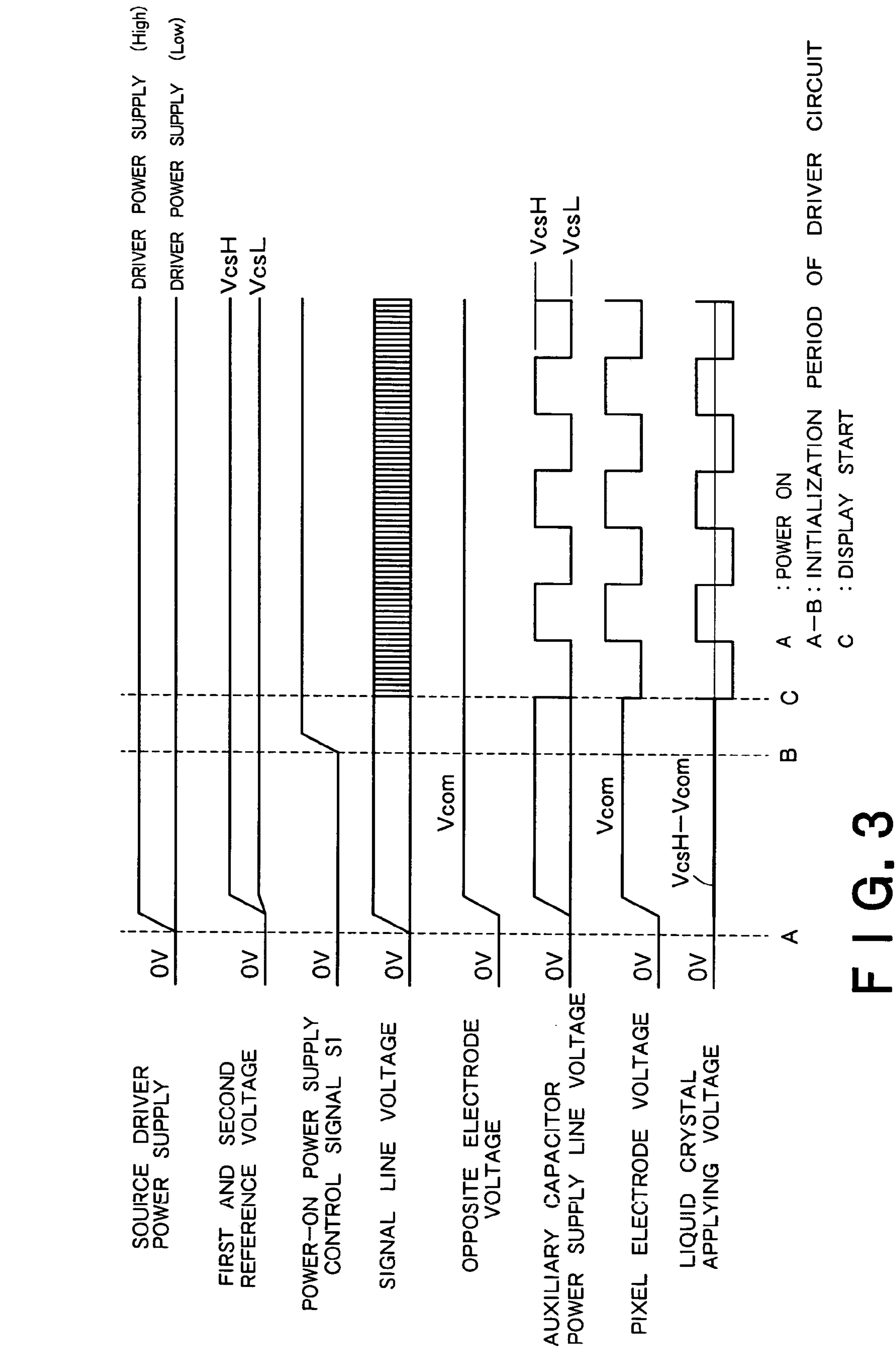
FIG. 3 is an operational timing diagram of the auxiliary capacitor power supply selection circuit of FIG. 2.

FIG. 3 is an operational timing diagram of the auxiliary capacitor power supply control circuit 6 of FIG. 2. FIG. 3 shows waveforms of a power supply for the source driver 5, the first and second reference voltages VcsH and VcsL, the power-on power supply control signal, the signal line voltage, a voltage on the opposite electrode, the voltages on the auxiliary capacitor power supply lines CS1-CSn, and voltages at both ends of the liquid crystal C2.

Hereinafter, with reference to FIG. 3, operations of the auxiliary capacitor power supply selection circuit 6 of FIG. 2 will be described. All the auxiliary capacitor power supply selection circuits 6 in the liquid crystal display have the same configuration as that of FIG. 2. All the auxiliary capacitor power supply lines CS1-CSn are driven in the same manner as that of FIG. 2.

At time “A” in FIG. 3, the power supply of the liquid crystal display is turned on. As shown in FIG. 3, the voltages in FIG. 2 gradually rise after power-on time. Accordingly, for a while after power-on, the voltage waveforms in FIG. 2 become unstable.

According to the present embodiment, the power-on power supply control signal s1 is set to be low level (0V) during a predetermined period after power-on, i.e. for time “A”-“B”. Therefore, the outputs of the AND gates 10 in the auxiliary capacitor power supply selection circuits 6 in FIG. 2 become low level, the PMOS transistors 9 turn on, and the first reference voltage VcsH is supplied to the auxiliary capacitor power supply lines CS1-CSn.

Because the first reference voltage VcsH is higher than the second reference voltage VcsL, the voltages on all the auxiliary capacitor power supply lines CS1-CSn become high for a predetermined period after power-on. When the voltages on the auxiliary capacitor power supply lines CS1-CSn become high, the voltages of the pixel electrodes 2 also become high relatively, thereby lowering the voltages at both ends of the liquid crystal C2 (a difference voltage between the voltage of the opposite electrode 3 and the voltages of the pixel electrodes 2). Therefore, for example, in the case of the liquid crystal display of normally white operation (white display at time of applying the signals), display near to white display is obtained at power on, and the undesirable bright line does not emerge.

After then, at time “B”, the auxiliary capacitor power supply control circuits 6 in FIG. 2 set the power-on power supply control signal s1 to be high level. Therefore, the logic of the AND gate 10 changes depending on the logic of the polarity reversal power supply control signal s2, and accordingly, on/off of the NMOS transistor 8 and the PMOS transistor 9 changes in sync with a cycle of the polarity reversal drive.

Therefore, the voltages on the auxiliary capacitor power supply lines CS1-CSn become the first reference voltage VcsH or the second reference voltage VcsL in sync with the cycle of the polarity reversal drive.

As described above, according to the first embodiment, all the auxiliary capacitor power supply lines CS1-CSn are set to the power supply voltages equal to each other (first reference voltage) for a predetermine period after power-on. Therefore, the voltage levels on the auxiliary power supply lines CS1-CSn does not fluctuate, and the undesirable bright line in horizontal line direction does not appear.

Furthermore, according to the first embodiment, the voltage difference between the voltages on the auxiliary capacitor power supply lines CS1-CSn and the voltage of the opposite electrode 3 becomes small. Because of this, in the case of normally white operation, display near to white display is obtained for a predetermined period after power-on, and the undesirable bright line does not emerge.

(Second Embodiment)

A second embodiment has a feature in that it is possible to prevent display of a undesirable bright line horizontal line direction at power shutdown time.

Figure 4:
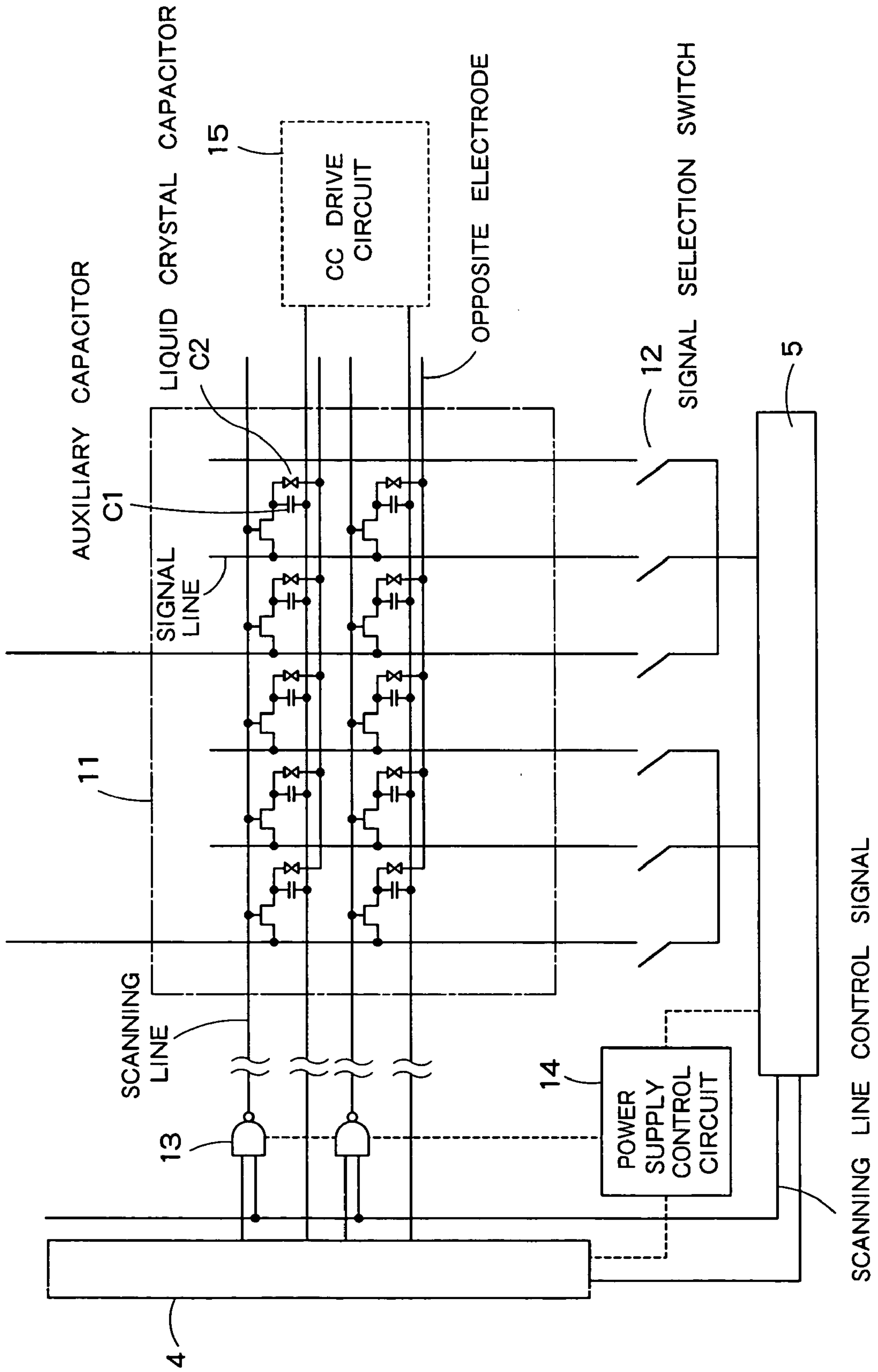
FIG. 4 is a block diagram showing schematic configurations of a liquid crystal display according to a second embodiment of the present invention.

FIG. 4 is a block diagram showing schematic configurations of a liquid crystal display according to a second embodiment of the present invention. In FIG. 4, the same reference numerals are attached to constituents common to those of FIG. 1. Hereinafter, different points will be mainly described.

The liquid crystal display of FIG. 4 has a display area section 11 formed on a glass substrate 20, a source driver 5 implemented on the glass substrate 20, and signal selection switches 12 capable of selecting at least one of signal line among a plurality of signal lines. The signal lines selected by the signal selection switches 12 are supplied with the output signal of the source driver 5. In the example of FIG. 4, three signal lines are supplied with a common one output signal of the source driver 5 via the signal selection switches 12. It is possible to reduce the number of output terminals of the source driver 5 by providing the signal selection switches 12.

The number of the signal lines selected by the signal selection switches 12 is not necessarily limited to three, but may be two or more than three.

The display area section 11 has signal lines and scanning lines arranged in vertical and horizontal directions, pixel TFTs 1 formed in vicinity of cross points of the signal lines and the scanning lines, and auxiliary capacitors C1 and liquid crystal capacitors C2 connected to the pixel TFTs 1. One ends of the auxiliary capacitors C1 are connected to the pixel TFTs 1, and the other ends are connected to the auxiliary capacitor line CS1.

Figure 5:
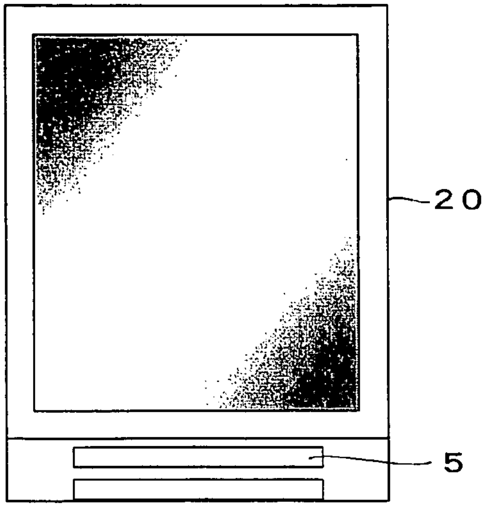
FIG. 5 is a schematic layout diagram on a glass substrate.

The source driver 5 is implemented on the glass substrate 20 by COG (Chip On Glass). Actually, as shown in FIG. 5, the source driver 5 is implemented in vicinity of an end portion of the glass substrate 20.

The scanning line drive circuit 4 drives the scanning lines in sequence. A buffer circuit 13 at last stage in the scanning line drive circuit 4 becomes high level forcedly when the scanning line control signal supplied from the source driver 5 becomes low level. Therefore, all the pixel TFTs 1 turn on.

The source driver 5 sets the scanning line control signal to be low level at power shutdown time. Therefore, at power shutdown time, all the pixel TFTs turn on just before the power supply voltage lowers.

All the signal selection switches 12 turn on once at power shutdown time. At this time, the source driver 5 sets all the output terminals to a common voltage. The common voltage is a voltage equal to a voltage on the opposite electrode (hereinafter, this common voltage is called opposite electrode voltage). Because the signal selection switches 12 and the pixel TFTs 1 are turned on, one end voltages of the liquid crystal capacitors C2 become the opposite electrode voltage.

A partial circuit in the scanning line drive circuit 4 including the buffer circuit 13 is supplied with a power supply voltage different from a power supply voltage supplied to the other circuits in the scanning line drive circuit 4. The power supply voltage for the partial circuit in the scanning line drive circuit 4 including the buffer circuit 13 is generated by delaying the power supply voltage for the other circuit with the power supply control circuit 14 of FIG. 4. Accordingly, a timing when the output voltage for the partial circuit including the buffer circuit 13 lowers is slower than that of the other circuit.

The present embodiment performs CC (Capacitively Coupled) driving. In CC driving, at a state of turning on the pixel TFTs, the signal voltage is supplied to the signal lines. The voltage on the auxiliary capacitor line CS1 is changed in sync with a cycle of polarity reverse, and therefore, the voltage at both ends of the liquid crystal layer is set. More specifically, in the case of positive polarity, the auxiliary capacitor line CS1 is set to be high level. In the case of negative polarity, the auxiliary capacitor line CS1 is set to be low level. The opposite electrode is fixed on a predetermined DC voltage. The CC driving has a feature in that response is good. Especially, image quality in the case of displaying moving image is improved. In order to perform the CC driving, there is provided a CC driving circuit 15 for controlling the voltage on the auxiliary capacitor lines CS.

Figure 6:
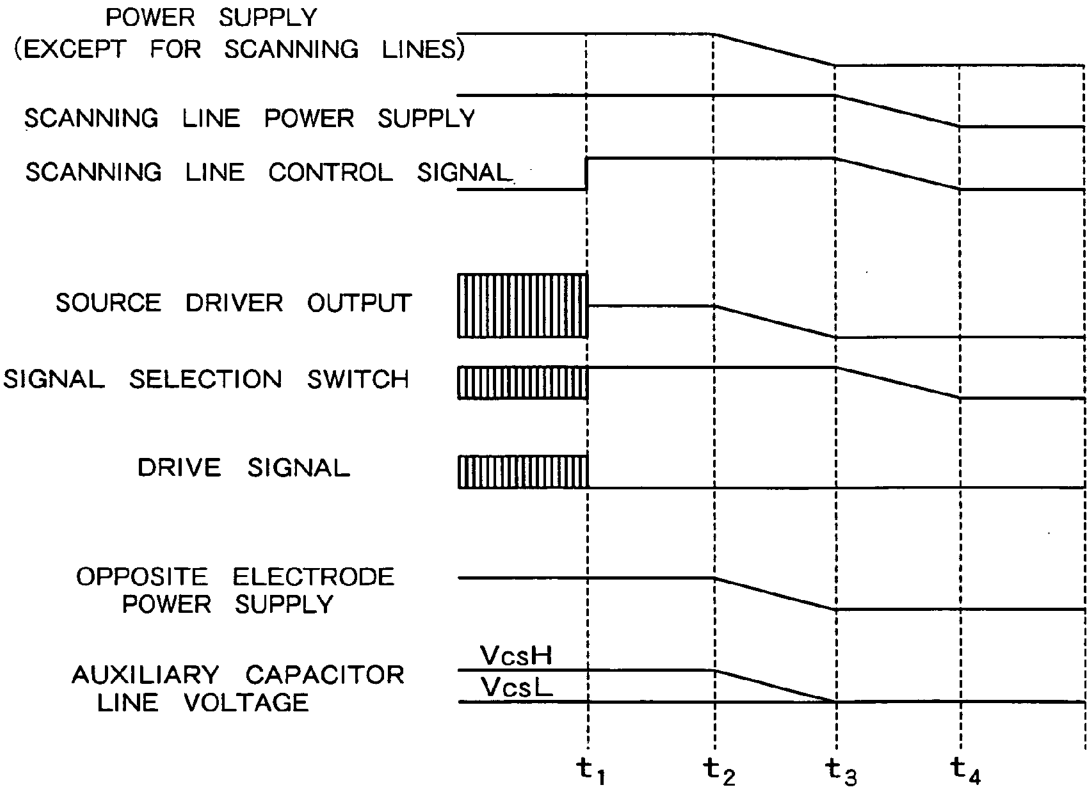
FIG. 6 is an operational timing diagram of a liquid crystal display of FIG. 4.

FIG. 6 is an operational timing diagram of the liquid crystal display of FIG. 4, and shows the operational timing at power shutdown time. Ordinary display operation is performed until time t1. At time to, the driving signal for driving the scanning lines becomes low level, and the outputs of the source driver 5 become the opposite electrode voltage. All the signal selection switches 12 turn on, and all the signal lines are supplied with the opposite electrode voltage.

Furthermore, the scanning line control signal supplied to the scanning line drive circuit 4 from the source driver 5 becomes high. Therefore, the buffer circuit 13 at last stage in the scanning line drive circuit 4 becomes high level. Accordingly, all the scanning lines become high level, and all the pixel TFTs 1 turn on. At this time, because all the signal lines are supplied with the opposite electrode voltage, the voltages at both ends of the liquid crystal capacitors C2 become equal to each other, and the voltage applied to the liquid crystal layer becomes 0V.

After then, at time t2, the power supply voltages in the circuits except for the buffer circuit 13 at last stage in the scanning line drive circuit 4 begins lowering. Accordingly, the voltages of the opposite electrode and the auxiliary capacitor lines also lower, and the electric charges accumulated in the liquid crystal capacitors C2 and the auxiliary capacitors C1 are discharged.

After then, at time t3, the power supply voltages of the buffer circuits 13 at last stage in the scanning line drive circuit 4 begin lowering. At time t4, all the circuits stop operation.

As described above, according to the second embodiment, at power shutdown time, all the signal lines are once supplied with the opposite electrode voltage, and the voltage applied to the liquid crystal layer is set to 0V, thereby preventing display irregularity due to line noise in horizontal direction. According to the second embodiment, after accumulated electric charge of the liquid crystal capacitors C2 and the auxiliary capacitors C1 is discharged, the pixel TFTs are turned off. Because of this, it is possible to reduce display irregularity due to remaining electric charge.

(Third Embodiment)

A third embodiment performs display irregularity preventing control at power-on time and power shutdown time based on a control signal supplied from outside of a glass substrate.

Figure 7:
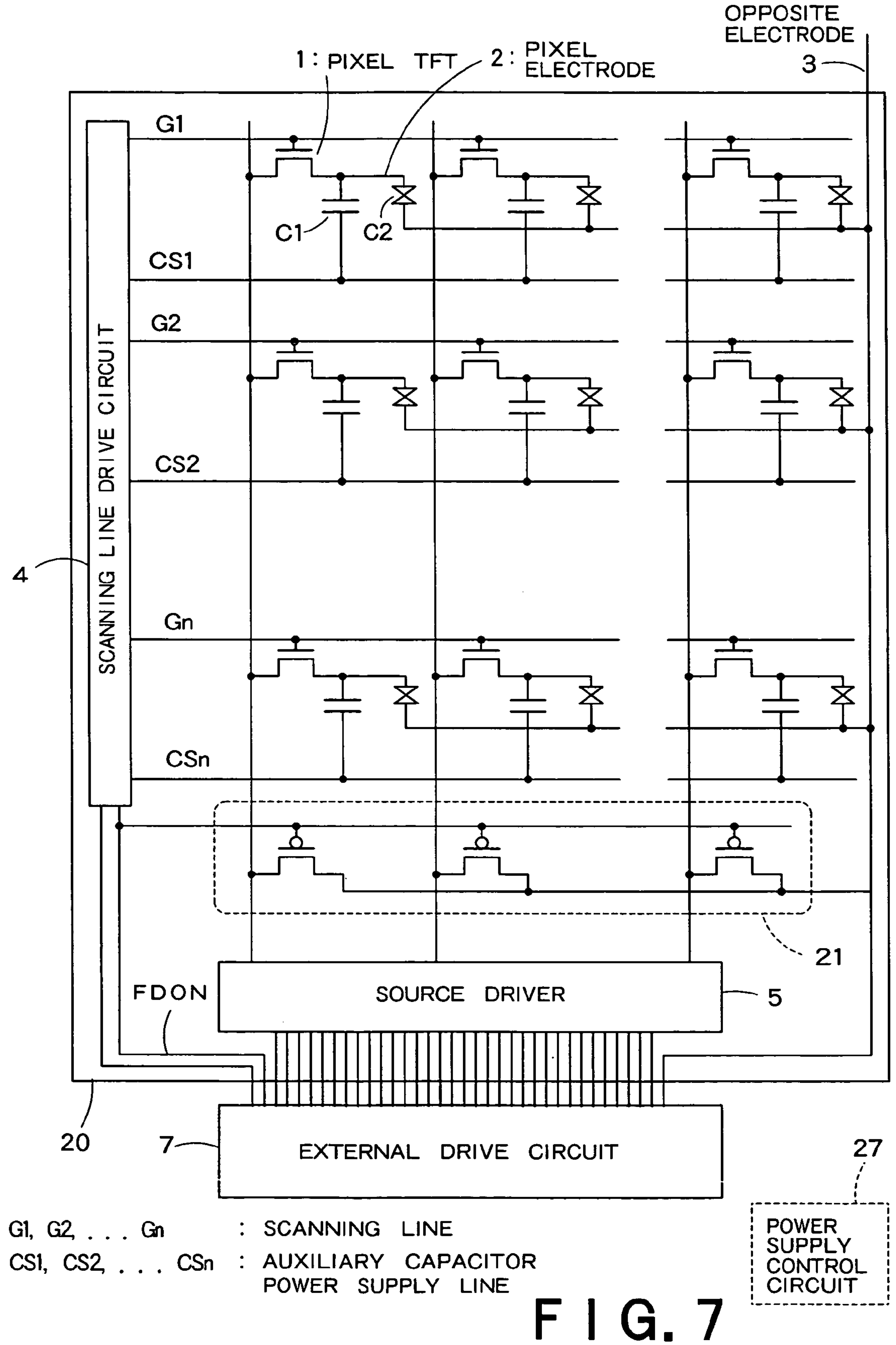
FIG. 7 is a block diagram showing schematic configurations of a liquid crystal display according to a third embodiment of the present invention.

FIG. 7 is a block diagram showing schematic configurations of a liquid crystal display according to a third embodiment of the present invention. In FIG. 7, the same reference numerals are attached to constituents common to those of FIG. 1. Hereinafter, different points will be mainly described.

The liquid crystal display of FIG. 7 has a glass substrate 20 and an external drive circuit 7. The glass substrate 20 and the external drive circuit 7 are connected through an FPC (Flexible Print Circuit) and so on. Pixel TFTs 1, liquid crystal capacitors C2, auxiliary capacitors C1, a scanning line drive circuit 4 and a source driver 5 as well as a signal line voltage control circuit 21 for setting signal line voltages at power-on time and power shutdown time are provided on the glass substrate 20. The source driver 5 is formed of an IC implemented on the glass substrate 20. The scanning line drive circuit 4 and the signal line voltage control circuit 21 may be formed on the glass substrate 20, or implemented on the glass substrate 20 as an IC.

The scanning line drive circuit 4 is supplied with a control signal FDON from the external drive circuit 7. With the control signal FDON, it is possible to reduce display irregularity at power-on time and power shutdown time.

Figure 8:
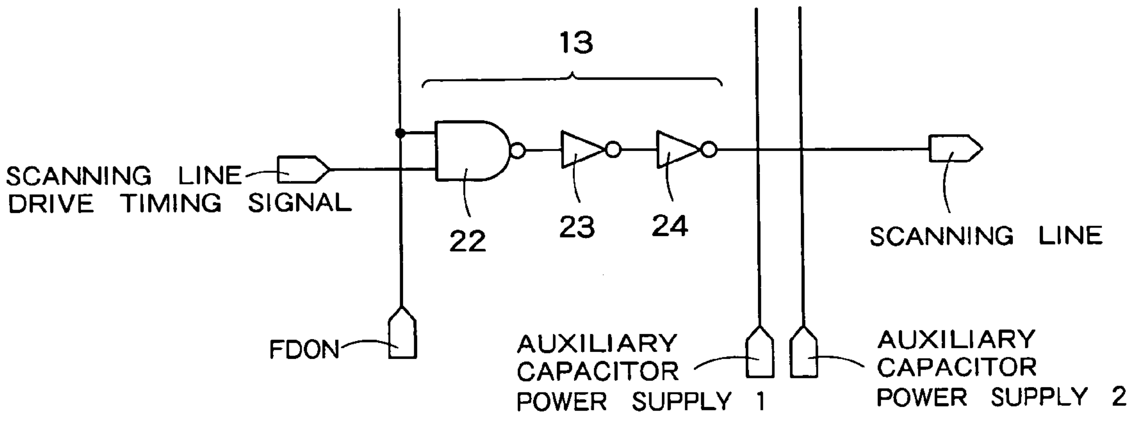
FIG. 8 is a circuit diagram showing one embodiment of concrete configurations of a buffer circuit at last stage in the scanning line drive circuit.
Figure 9:
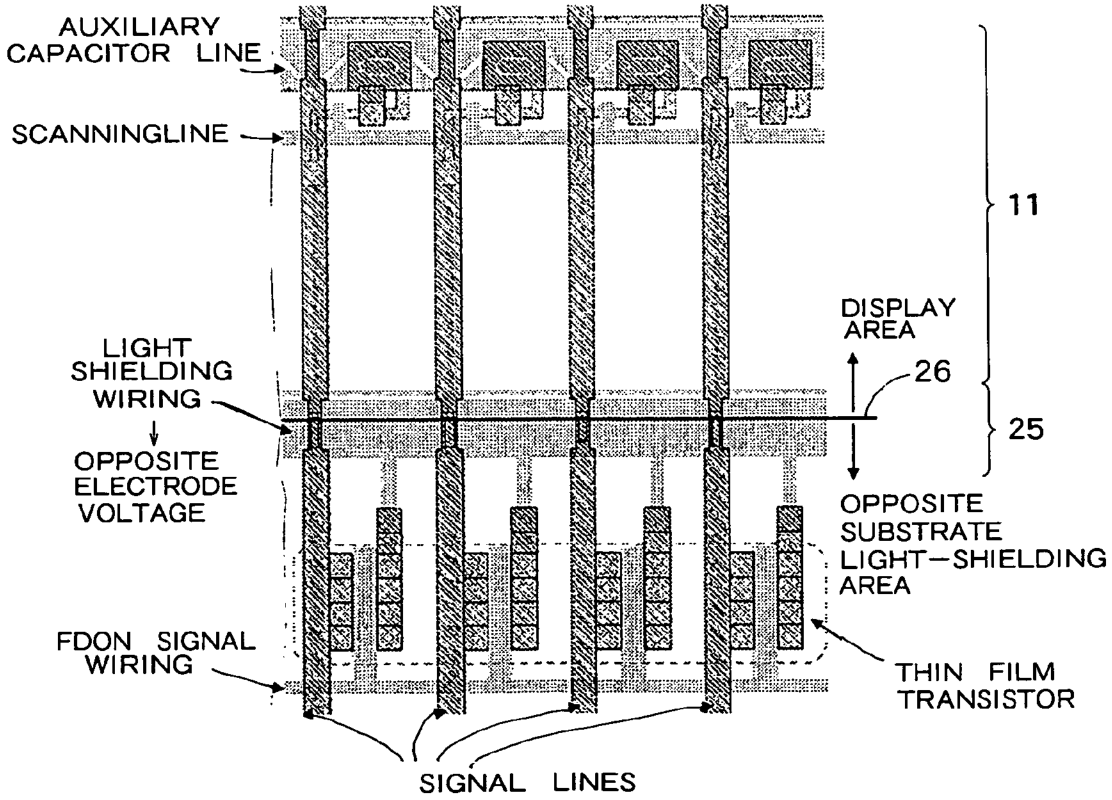
FIG. 9 is a detailed layout diagram on the glass substrate.

FIG. 8 is a circuit diagram showing one example of concrete configurations of the buffer circuit 13 at last stage in the scanning line drive circuit 4. As shown in FIG. 8, an NAND circuit 22 and inverters 23 and 24 connected in serial to an output terminal of the NAND circuit 22 are provided for each scanning line. The NAND circuit 22 operates reversal logical product between a scanning line drive timing signal and the control circuit FDON. For example, when the control signal FDON is in low level, the output of the NAND circuit 22 becomes forcedly high, and the scanning lines also become high. Accordingly, all the pixel TFTs 1 connected to the scanning line are turned on.

The control signal FDON is supplied to all the NAND circuits 22 in the scanning line drive circuit 4. Because of this, when the control signal FDON is in low level, all the pixel TFTs 1 in the display area section 11 are turned on.

The external drive circuit 7 sets the control signal FDON to be low level only for a predetermined period at power-on time and power shutdown time. During this period, all the pixel TFTs 1 are turned on.

The signal line voltage control circuit 21 has a plurality of PMOS transistors connected to the signal lines, respectively. Gates of the PMOS transistors are supplied with the control signal FDON. Drains of the PMOS transistors are supplied with the same voltage as that of the opposite electrode (opposite electrode voltage).

When the control signal FDON becomes low level, all the PMOS transistors in the signal line voltage control circuit 21 turns on, and the signal lines are supplied with the opposite electrode voltage. The opposite electrode voltage applied to the PMOS transistors are supplied via a metal wiring 26 for light shielding arranged along a rim area of the display area section 11. Because the opposite electrode voltage is applied to the PMOS transistors by using the light shielding area 25 provided originally, it is unnecessary to provide a wiring area for the opposite electrode voltage.

Figure 10:
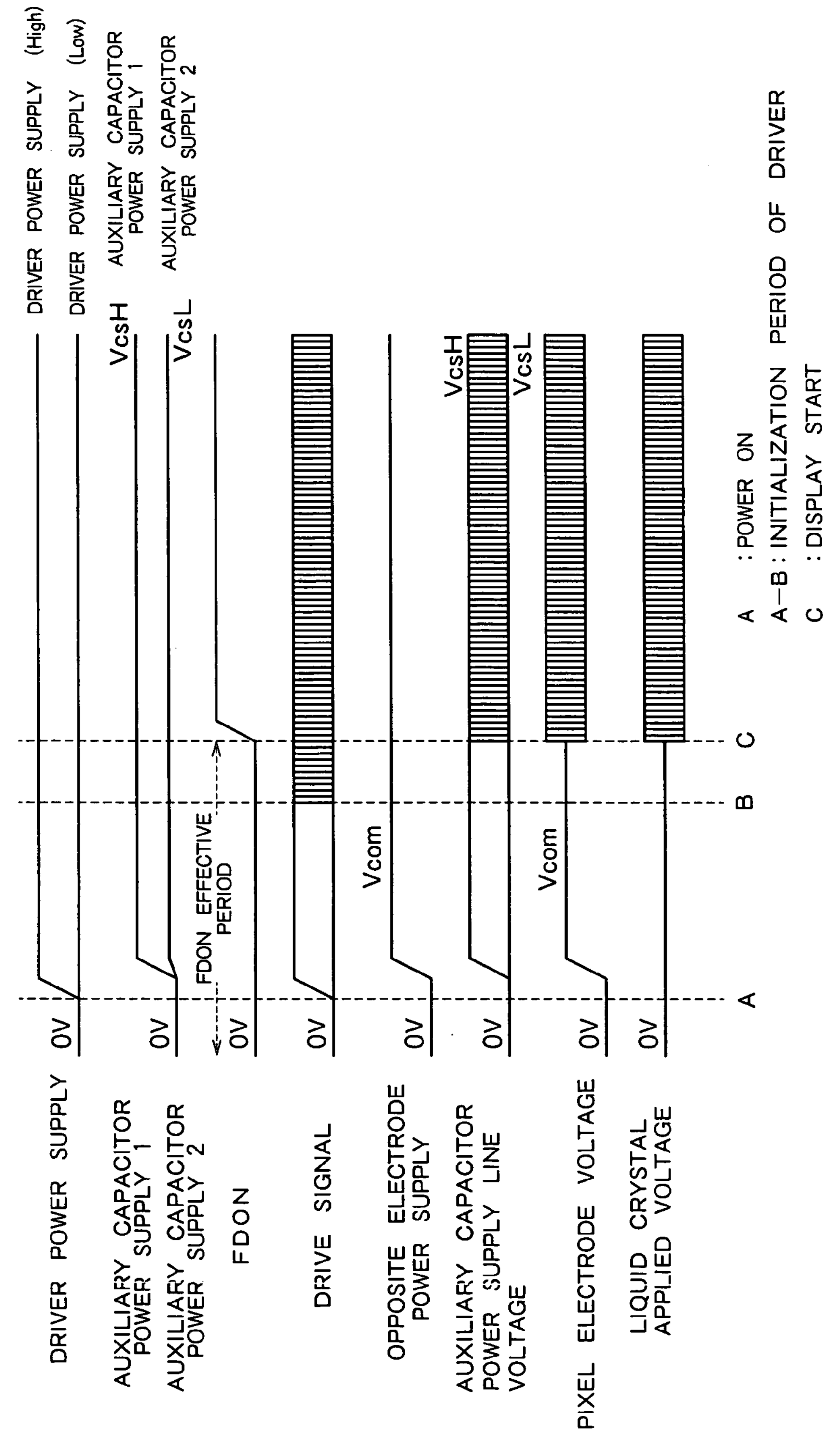
FIG. 10 is an operational timing diagram at power-on time.

FIG. 10 is an operational timing diagram at power-on time. When the power supply is turned on at time A, the power supply voltages of the source driver 5 and the scanning line drive circuit 4 begin rising. At time A, the control signal FDON is low level. After then, at time B, the scanning line drive circuit 4 outputs the scanning line drive timing signal. At this time, the control signal is still in low level. At time C, the control signal becomes high level. When the control signal FDON is in low level, all the pixels TFT 1 are turned on, and the opposite electrode voltage is supplied to all the signal lines. Because of this, the voltages at both ends of the liquid crystal capacitors C2 become equal, and the voltage applied to the liquid crystal become 0V. Accordingly, during this period, display irregularity due to the undesirable bright line in horizontal line direction does not emerge.

During time A-C, display updating for one or a few flames is performed. After then, at time C, the control signal FDON becomes high level. The scanning line drive circuit 4 drives the scanning lines in sequence. The source driver 5 supplies the signal line voltage to the signal lines, in order to perform ordinary display operation.

Figure 11:
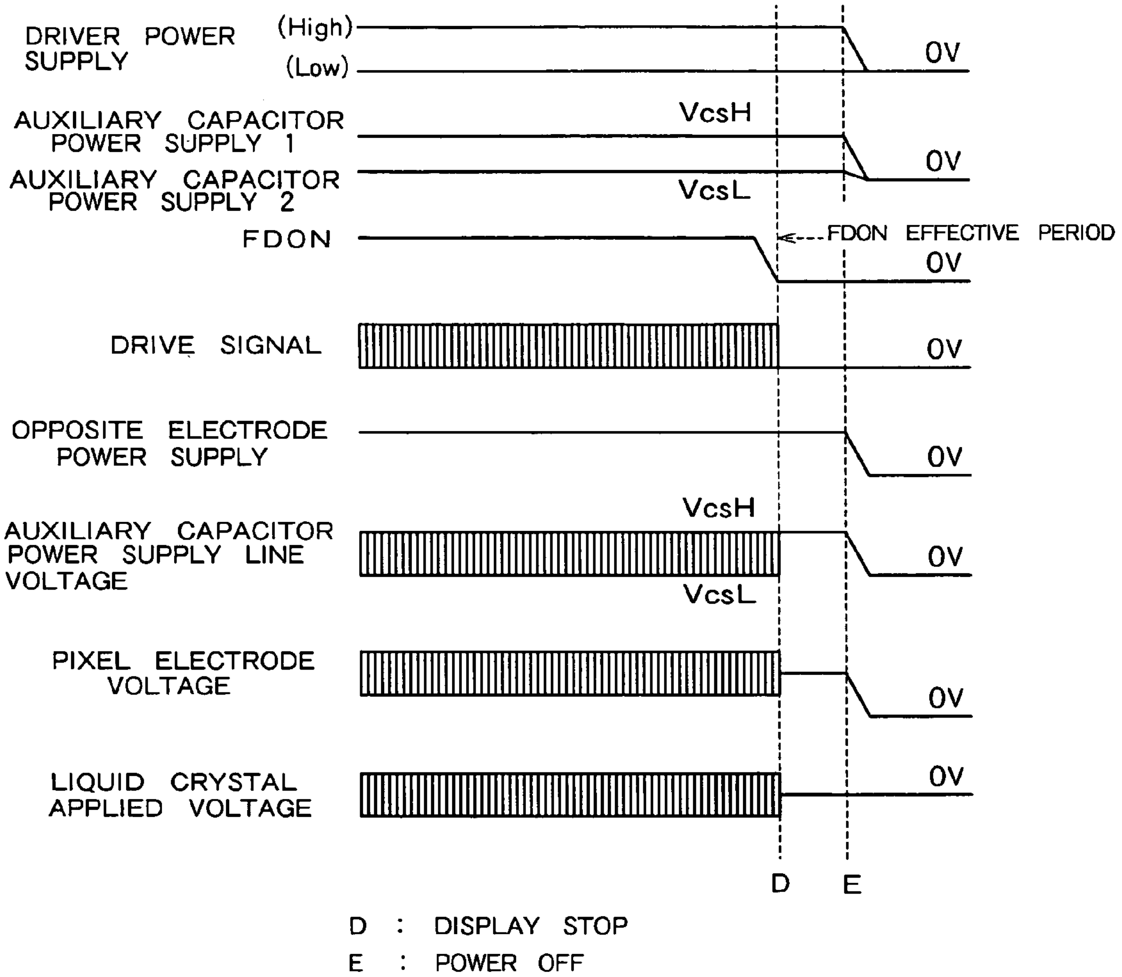
FIG. 11 is an operational timing diagram at power shutdown.

Power supply control of the scanning line drive circuit 4 and the source driver 5 are performed by the power supply control circuit 27 of FIG. 11.

FIG. 11 is an operational timing diagram at power supply shutdown time. Before shutting down the power supply of the source driver 5 and the scanning line drive circuit 4, the control signal FDON is firstly set to be low level at time D in order to stop the output of the scanning line drive timing signal. By setting the control signal FDON to be low level, all the outputs of the buffer circuits 13 at last stage in the scanning line drive circuit 4 become high level. Therefore, all the pixels TFT1 are turned on. All the PMOS transistors in the signal line voltage control circuit 21 turn on, and the opposite electrode voltage is supplied to all the signal lines. Therefore, the voltages at both ends of the liquid crystal capacitor C2 become equal substantially, and the voltage applied to the liquid crystal becomes 0V. Therefore, the bright line noise in horizontal direction does not emerge.

After then, at time E, the power supply voltage of the scanning line drive circuit 4 and the source drive 5 begins lowering. Therefore, the opposite electrode voltage and the pixel electrode voltage also lower in the same way, and the voltage applied to the liquid crystal does not change at 0V. Accordingly, after time E, the bright line noise in horizontal direction does not emerge.

As described above, according to the second embodiment, with the control signal FDON supplied from outside of the glass substrate 20, it is possible to control display irregularity at power-on time and power shutdown time. Accordingly, it is possible to control display irregularity if necessary without complicating the circuits.

Furthermore, according to the present embodiment, the opposite electrode voltage line for setting the signal lines to the opposite electrode voltage is arranged in a light shielding area provided originally. Because of this, it is unnecessary to provide a new area for the opposite electrode voltage line, thereby reducing the rim area of a display panel.

What is claimed is:

1. A liquid crystal display, comprising;

signal lines and scanning lines arranged in first and second directions on an insulation substrate;

pixel switching elements formed in vicinity of cross points of the signal lines and the scanning lines;

a signal line drive circuit which drives the signal lines and has a source driver; and a scanning line drive circuit which drives the scanning lines, wherein said scanning line drive circuit drives the scanning lines to turn on all of said pixel switching elements when a power supply of said source driver and said scanning line drive circuit is shut down; and said signal line drive circuit applies a predetermined voltage to all the signal lines when the power supply is shut down.

2. The liquid crystal display according to claim 1, wherein said scanning line drive circuit has buffer circuits which drive the scanning lines, for each scanning line, further comprising a power supply control circuit which lowers power supply voltages of said buffer circuits while staggering time, after a power supply of said signal line drive circuit lowers.

3. The liquid crystal display according to claim 2, further comprising:

liquid crystal capacitors and auxiliary capacitors, each being provided corresponding to each of said pixel switching elements, which accumulate electric charge in accordance with voltages of the signal lines;

pixel electrodes to which one ends of said pixel switching elements, said liquid crystal capacitors and said auxiliary capacitors are commonly connected;

auxiliary capacitor power supply lines to which one ends of said auxiliary capacitors are commonly connected; and an opposite electrode arranged opposite to said pixel electrodes by sandwiching a liquid crystal, wherein said power supply control circuit lowers the power supply voltage of said buffer circuits at power shutdown time, at the state of turning on all the pixel switching elements, after discharging electric charge accumulated in said liquid crystal capacitors and said auxiliary capacitors.

4. The liquid crystal display according to claim 1, further comprising:

liquid crystal capacitors and auxiliary capacitors which are provided corresponding each of said pixel switching elements, respectively, and accumulate electric charge in accordance with voltages of the signal lines;

auxiliary capacitor power supply lines to which one ends of said auxiliary capacitors are commonly connected; and a CC drive circuit which drives with pulses said auxiliary capacitor power supply lines while turning on said pixel switching elements.

5. The liquid crystal display according to claim 1, further comprising a signal line selection circuit which are provided corresponding to a plurality of signal lines, and supplies signal line voltages outputted from said signal line drive circuit to the signal line selected from all the signal lines, wherein said signal line selection circuit supplies a voltage substantially equal to opposite electrode voltages outputted from said signal line drive circuit to all of the corresponding signal lines at power shutdown time.

* * * * *